United States Patent [19]

O'Brien et al.

[11] Patent Number: 5,142,809
[45] Date of Patent: Sep. 1, 1992

[54] FISHING ROD HOLDER INCLUDING A NON-INVASIVE CLAMP FOR MOUNTING SAME TO A GUNWALE OR LIKE SURFACE

[76] Inventors: James R. O'Brien, 4355 Pilgrim Hollow Ct., Brookfield, Wis. 53005; Mohomed B. Agha, 3965 Suffolk La., Hoffman Estates, Ill. 60195; Roberet E. Luce, N169 W19820 Chestnut Ct., Apt. 11, Jackson, Wis. 53037; Paul S. Renard, 1428 Eder La., West Bend, Wis. 53095; Mark G. Sellers, W310 N6732 Chenaqua, Hartland, Wis. 53029

[21] Appl. No.: 630,223

[22] Filed: Dec. 19, 1990

[51] Int. Cl.⁵ ............................... A01K 97/10
[52] U.S. Cl. ................................ 43/21.2; 248/514; 248/515
[58] Field of Search ............... 43/21.2; 248/514, 515, 248/538; 403/373, 344

[56] References Cited

U.S. PATENT DOCUMENTS

| | | | |
|---|---|---|---|
| 2,314,633 | 3/1943 | Riedi | 43/21.2 |
| 2,540,584 | 2/1951 | Jaycox | 248/515 |
| 2,645,439 | 7/1953 | Gauthier | 248/515 |
| 2,682,127 | 6/1954 | Binder | 43/21.2 |
| 2,693,660 | 11/1954 | Nebergall | 248/514 |
| 2,704,412 | 3/1955 | Davis | 43/21.2 |
| 2,893,667 | 7/1959 | Shumaker | 248/514 |
| 3,140,069 | 7/1964 | McBurney | 248/40 |
| 4,372,072 | 2/1983 | Comeau . | |
| 4,425,729 | 1/1984 | Miyamae . | |
| 4,517,761 | 5/1985 | Bleggi . | |
| 4,614,323 | 9/1986 | Bauer . | |
| 4,624,069 | 11/1986 | Schneider . | |
| 4,658,533 | 4/1987 | Mendoza | 43/21.2 |
| 4,739,575 | 4/1988 | Behrle . | |
| 4,753,029 | 6/1988 | Shaw et al. . | |
| 4,807,384 | 2/1989 | Roberts | 43/21.2 |
| 4,819,903 | 4/1989 | Jimenez . | |
| 4,827,654 | 5/1989 | Roberts | 248/514 |
| 4,836,127 | 6/1989 | Wille . | |
| 4,852,291 | 8/1989 | Mengo . | |

Primary Examiner—Kurt Rowan
Attorney, Agent, or Firm—Godfrey & Kahn

[57] ABSTRACT

A fishing rod holder (10) has a tube member (20), a support (22), a spacer (24), and a clamp (26). The clamp (26) has a base (100), a first platen (102) attached to the base (100) at a first hinge (134), and a second platen (104) attached to the base (100) at a hinge (134), and a second platen (104) attached to the base (100) at a second hinge (136). The clamp (26) attaches to a gunwale (12) or like surface by setting the base (100) upon the gunwale (12) and collapsing the first platen (102) and the second platen (104) about the sides (16, 18) of the gunwale (12) by folding at the hinges (134, 136) and inserting a bolt (158) through a hole (120) in the base (100) and a hole (142) in the first platen (102) to secure the first platen (102). Likewise, the second platen (104) is secured by inserting a bolt (160) through a hole (122) in the base (100) and a hole (152) in the second platen (104). A block (176) that conforms and abuts against on of the sides of the gunwale may be substituted for one of the platens (102, 104) in gunwales of certain configurations. The spacer (24) is attached to the clamp (26), the support (22) is attached to the spacer (24), and the tube member (20) is attached to the support (22). The fishing rod is inserted into the tube member (20). The fishing rod holder (10) also incorporates other features of benefit to the user.

32 Claims, 11 Drawing Sheets

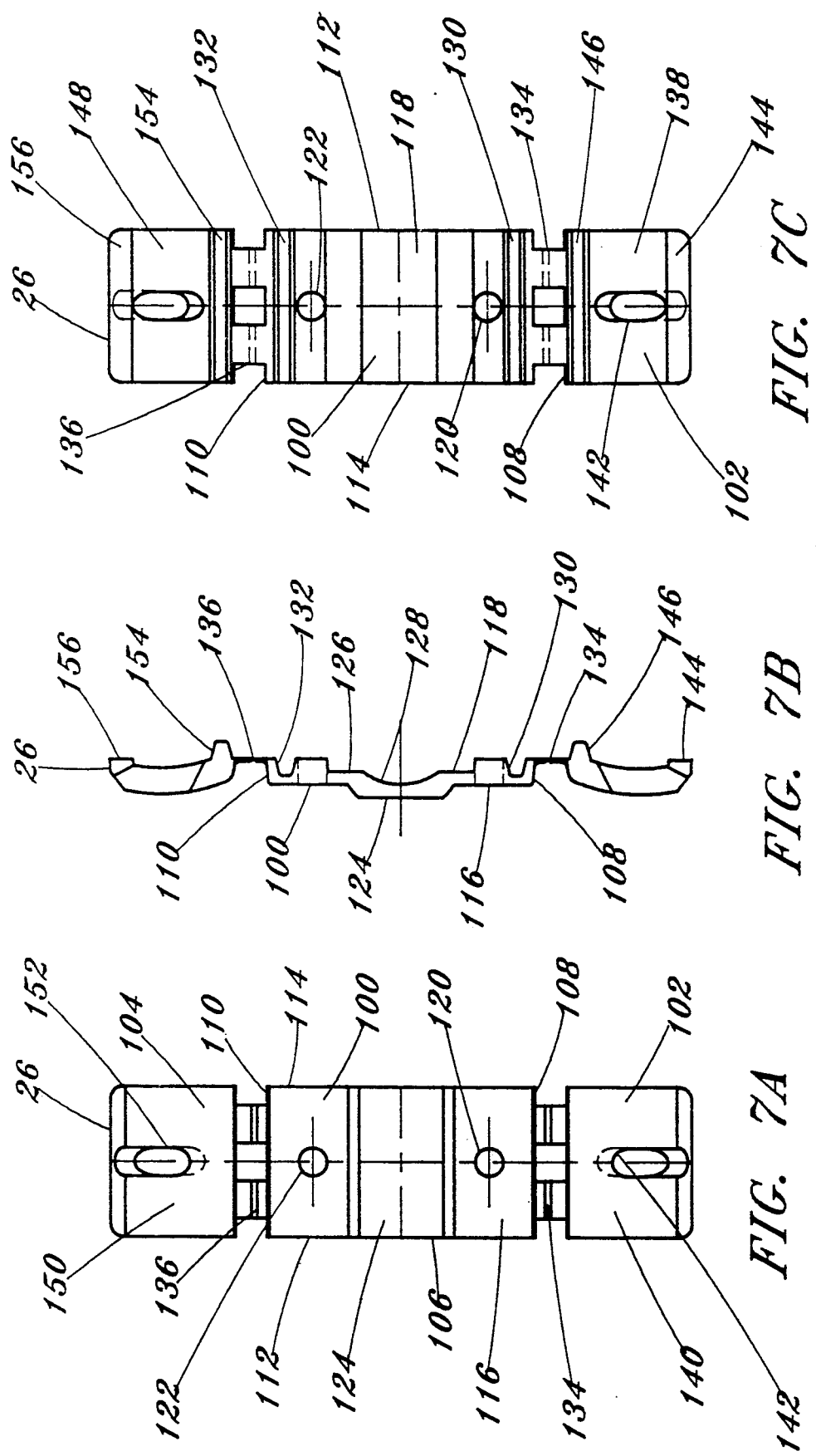

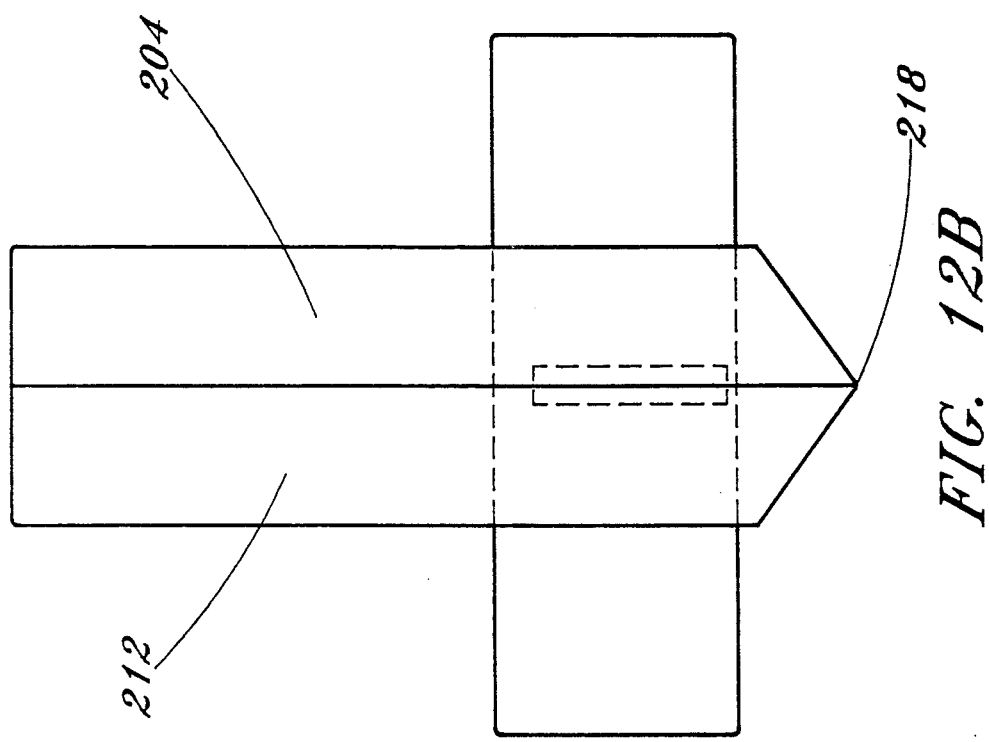
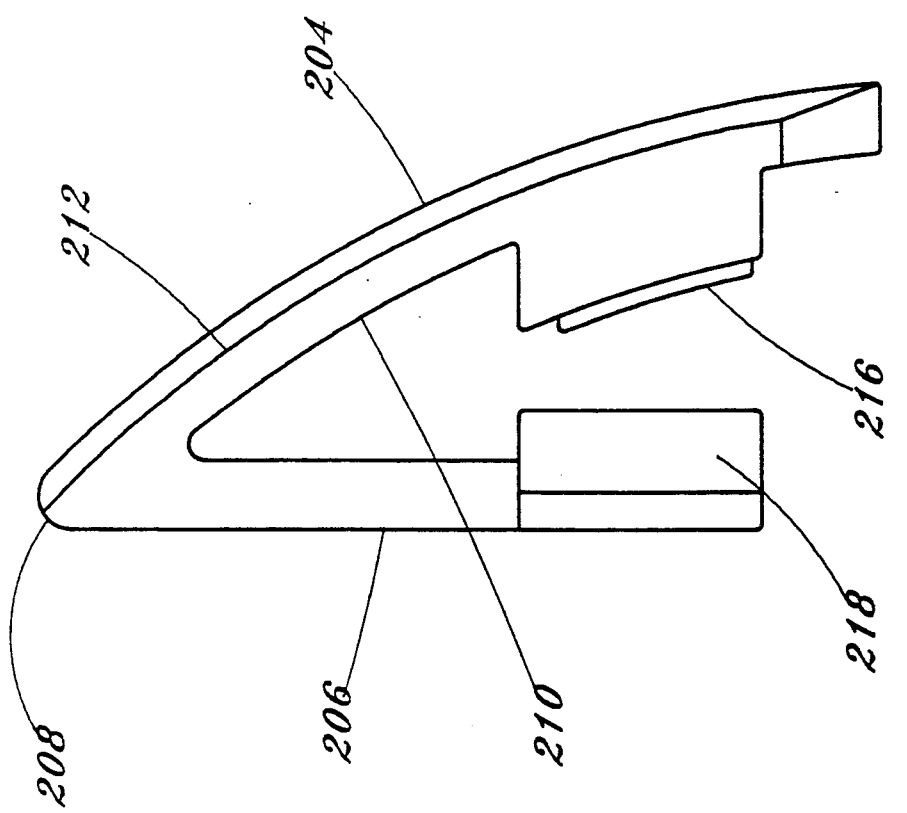
FIG. 12B
FIG. 12A

FISHING ROD HOLDER INCLUDING A NON-INVASIVE CLAMP FOR MOUNTING SAME TO A GUNWALE OR LIKE SURFACE

FIELD OF THE INVENTION

The present invention relates to fishing rod holders and to clamps for mounting such holders or other accessories to a gunwale or like surface and more particularly to a novel fishing rod holder that may be easily affixed by means of a non-invasive clamp to surfaces having various geometric features without modifying or disturbing the supporting surface of same.

BACKGROUND OF THE INVENTION

Fishing rod holders of various configurations are well-known in the art. A fishing rod holder typically is used to hold a fishing rod in an operational position on the stern of a boat during trolling operations. In this regard, the rod holders are normally mounted to a gunwale or other surface in the vicinity of the stern. The use of the fishing rod holder enables one's hands to remain free to attend to other activities within the boat and further permits a fisherman to attend to a number of different poles substantially simultaneously. The use of a plurality of rod holders also allows one to place bait and various lures at assorted depths during trolling. As should be understood, the use of a plurality of fishing rods permits experimentation between the different rods to determine the optimum fishing depths for catching the fish desired and to make adjustments accordingly. This activity, of course, maximizes the number of fish that may be caught.

Many of the prior art fishing rod holders damage the gunwale or otherwise compromise the structural or aesthetic integrity of the boat when they are mounted on same by utilizing drilling or hole punching techniques or further by scratching or denting various surfaces, such defacement occurring as a by-product of the mounting procedure. When the attachment or mounting is permanent, the result may be displeasing for both aesthetic and utilitarian purposes. For example, the space dedicated to permanently mounted fishing rod holders could conceivably be utilized for other boating or fishing accessories when not used for the fishing rod holders.

Accordingly, a need has existed for a fishing rod holder that may be readily and removably mounted in a non-invasive manner with respect to the boat and that may be easily manufactured at low cost and employ other features of benefit to the user.

SUMMARY OF THE INVENTION

In accordance with the broader aspects of the present invention, a fishing rod holder is provided that includes a tube member, a support member, a spacer, and a clamp. The clamp has a base, a first platen attached to the base at a first hinge, and a second platen attached to the base at a second hinge. The clamp may be attached to a gunwale or like surface by setting or resting the base of the clamp upon the gunwale and thereafter collapsing the first and second platens about the sides of the gunwale by folding at the first and second hinges. Bolts are inserted through holes that are formed in the base and first and second platens thereby securing the first and second platens in a predetermined collapsed position about the gunwale thereby securely positioning the clamp on the gunwale. The clamp is not attached permanently to the gunwale or like surface. Preferably, the clamp is made of a synthetic polymeric material such as polypropylene or similar material so as to not mar the surface of the gunwale or like surface and to further aid in the manufacture thereof by conventional injection molding techniques.

The fishing rod holder of the present invention further includes a block that may be utilized in place of one of the platens for attachment to gunwales that have certain configurations. In this regard, the block is attachable to and depends from the base of the clamp and conforms to and abuts against one of the sides of the gunwale. By use of the platens in combination, or alternately, by use of the block and one platen, the fishing rod holder of the present invention may be easily and readily secured to gunwales of many different configurations, thereby greatly facilitating its use on watercraft of all design.

As discussed above, the invention includes a spacer that is positioned on the clamp. Further, the support member is attached to the spacer, and the tube member is attached to the support. By the above mentioned interconnection, the fishing rod holder is rendered operable to be pivoted and positioned about a common axis and into assorted operational positions substantially in a horizontal plane. By means of a pivotal or rotational attachment of the tube member to the support, the horizontal rod holder can be moved or otherwise pivoted to assorted operational positions in a substantially vertical plane. In addition to the foregoing, the fishing rod is inserted into the tube member through a longitudinal slot that is formed in same and is held in place by a retainer clip. The outside peripheral surface or the boundary of the tube also includes a plurality of indicia that represent assorted fishing variables which are of interest and that may be monitored by the user of the device. Further, the tube includes movable markers that may be indexed relative to a particular indicium by the user thereof in order to facilitate the recollection of the variables represented by a particular indicium at a later time.

Further objects, features, and advantages of the present invention will be apparent from the following detailed description taken in combination with the accompanying drawings and attached claims.

BRIEF DESCRIPTION OF THE DRAWINGS

In the drawings:

FIG. 7A is a top plan view of the clamp employed with the fishing rod holder of the present invention, the first and second platens thereof being disposed in an unfolded relationship relative to the base of the clamp.

FIG. 7B is a side elevation view of the clamp employed with the fishing rod holder of the present invention, the first and second platens thereof being disposed in an unfolded relationship relative to the base of the clamp.

FIG. 7C is a bottom plan view of the clamp employed with the fishing rod holder of the present invention, the first and second platens thereof being disposed in an unfolded relationship relative to the base of the clamp.

FIG. 12A is a side elevation view of a marker used in association with the fishing rod holder of the present invention FIG. 12B is a plan view of the marker used in association with the fishing rod holder of the present invention.

DETAILED DESCRIPTION OF THE PREFERRED EMBODIMENT

Figure 1:
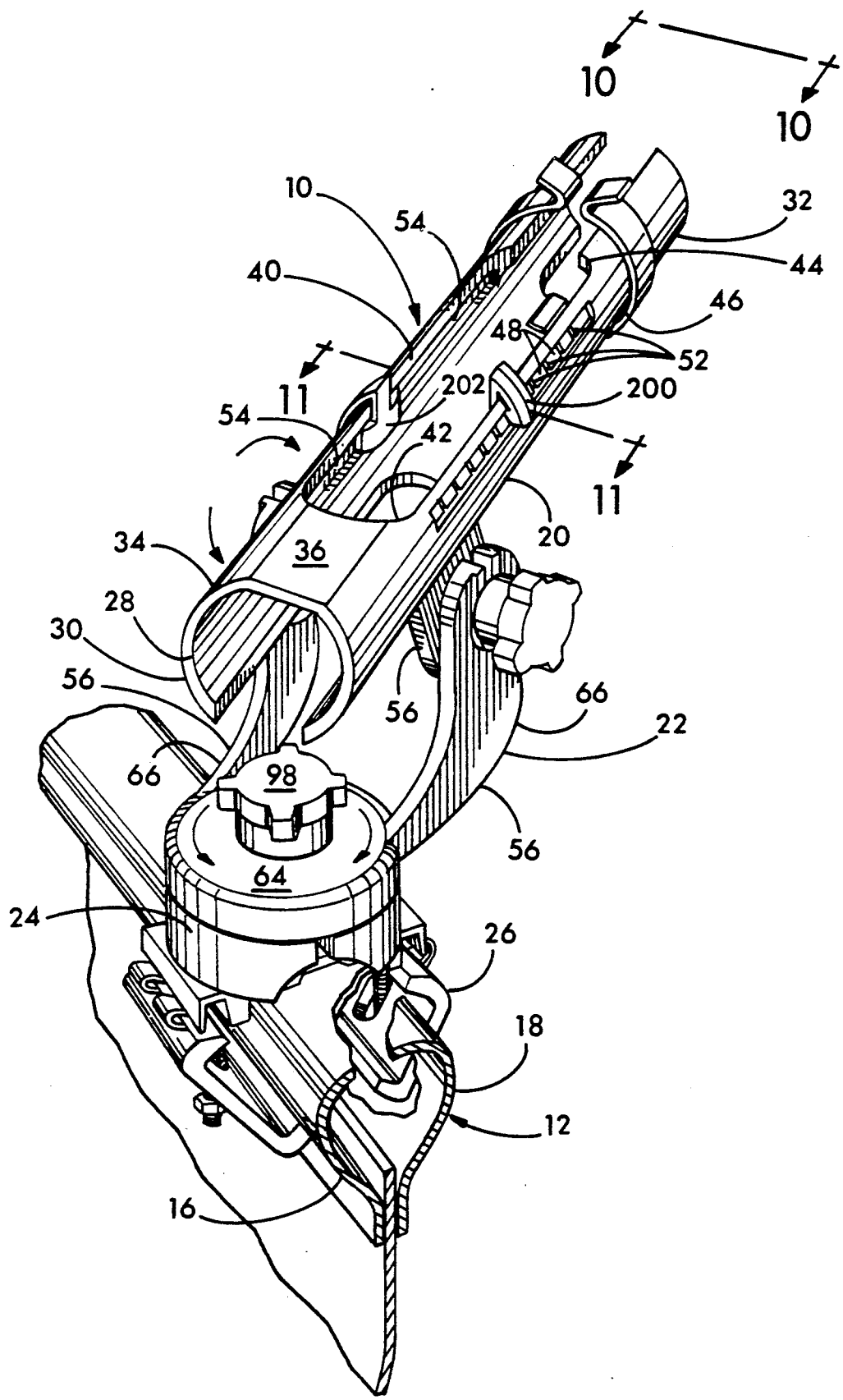
FIG. 1 is an environmental perspective view of the fishing rod holder of the present invention shown in assembled configuration with the clamp thereof mounted upon the gunwale of a boat.
Figure 2:
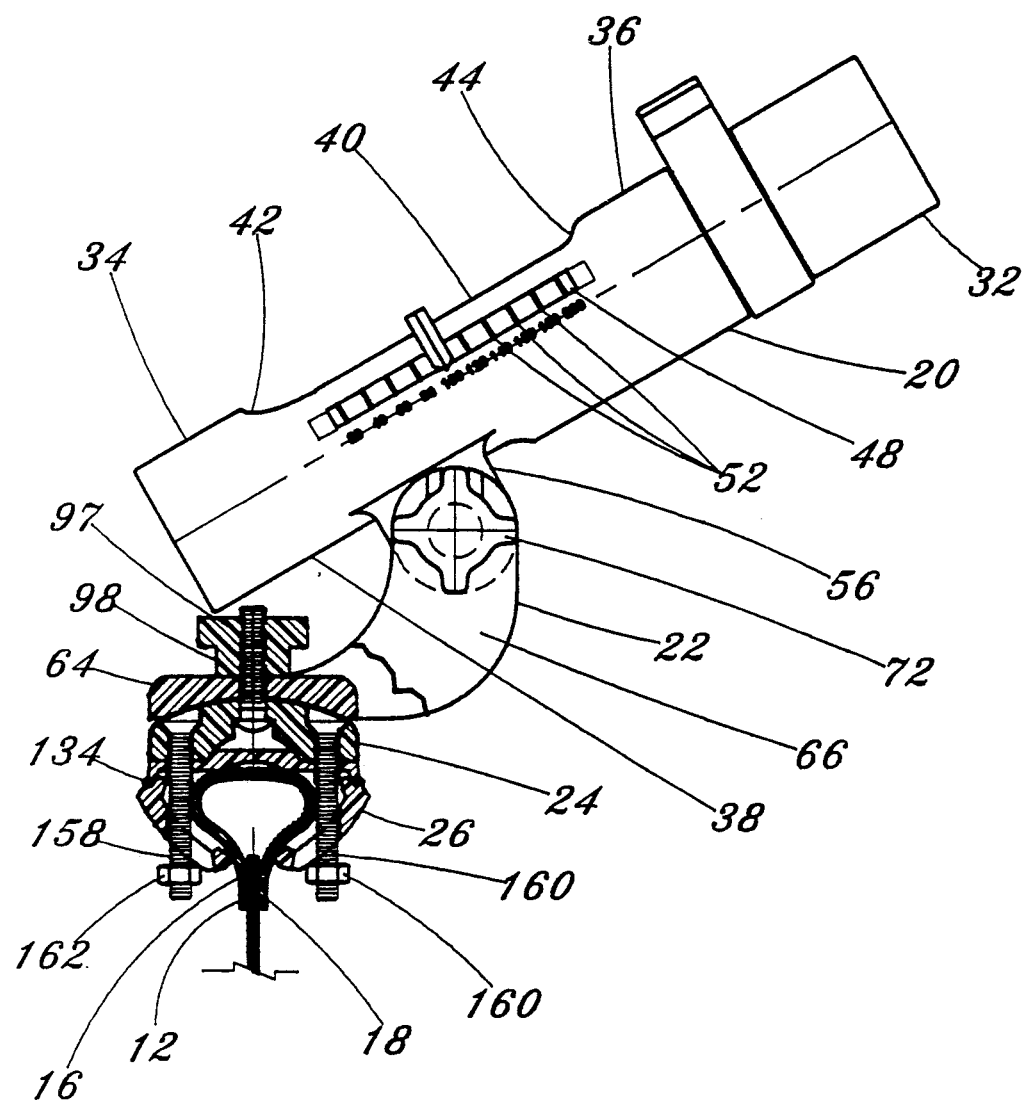
FIG. 2 is a fragmentary right side elevation view of the fishing rod holder shown in FIG. 1 and showing a portion of the support, spacer, and clamp in cut away fashion thereby illustrating the operation of the clamp.

With reference to the drawings, a fishing rod holder in accordance with the present invention is generally indicated by the numeral 10 in FIG. 1 and is shown in an assembled relationship and mounted upon a gunwale 12 or like surface of a boat. The gunwale 12 of the boat has an interior facing surface 16 and an exterior facing surface 18 that oppose each other. The cross-sectional shape of the gunwale 12, as represented in FIGS. 1 and 2, is substantially rounded in its overall configuration. The fishing rod holder 10 of the present invention includes a tube member 20, a support member 22, a spacer 24, and a clamp 26.

The tube member 20 is depicted in FIGS. 1, 2, 3, 4A and 4B. The tube member 20 is substantially cylindrical and linear in shape, having a bore 28 that is defined by an inside diametrical dimension and an outside boundary 30 defined by an outside diametrical dimension. The tube member 20 has a forward end 32 and a rearward end 34, the bore 28 extending therebetween such that the ends 32 and 34 are open-ended. The tube member 20 further has a top side or upwardly facing surface 36 and an opposite underside or downwardly facing surface 38. The top side 36 includes a slot 40 which extends substantially longitudinally forwardly of a step 42 to the forward end 32 thereof. The slot 5 40 is reduced in size at a second step 44. The outside boundary 30 further has formed therein a substantially circumferentially disposed notch 46 that is located between the second step 44 and the forward end 32, the operation of the notch 46 being explained in further detail hereinafter.

Figure 3:
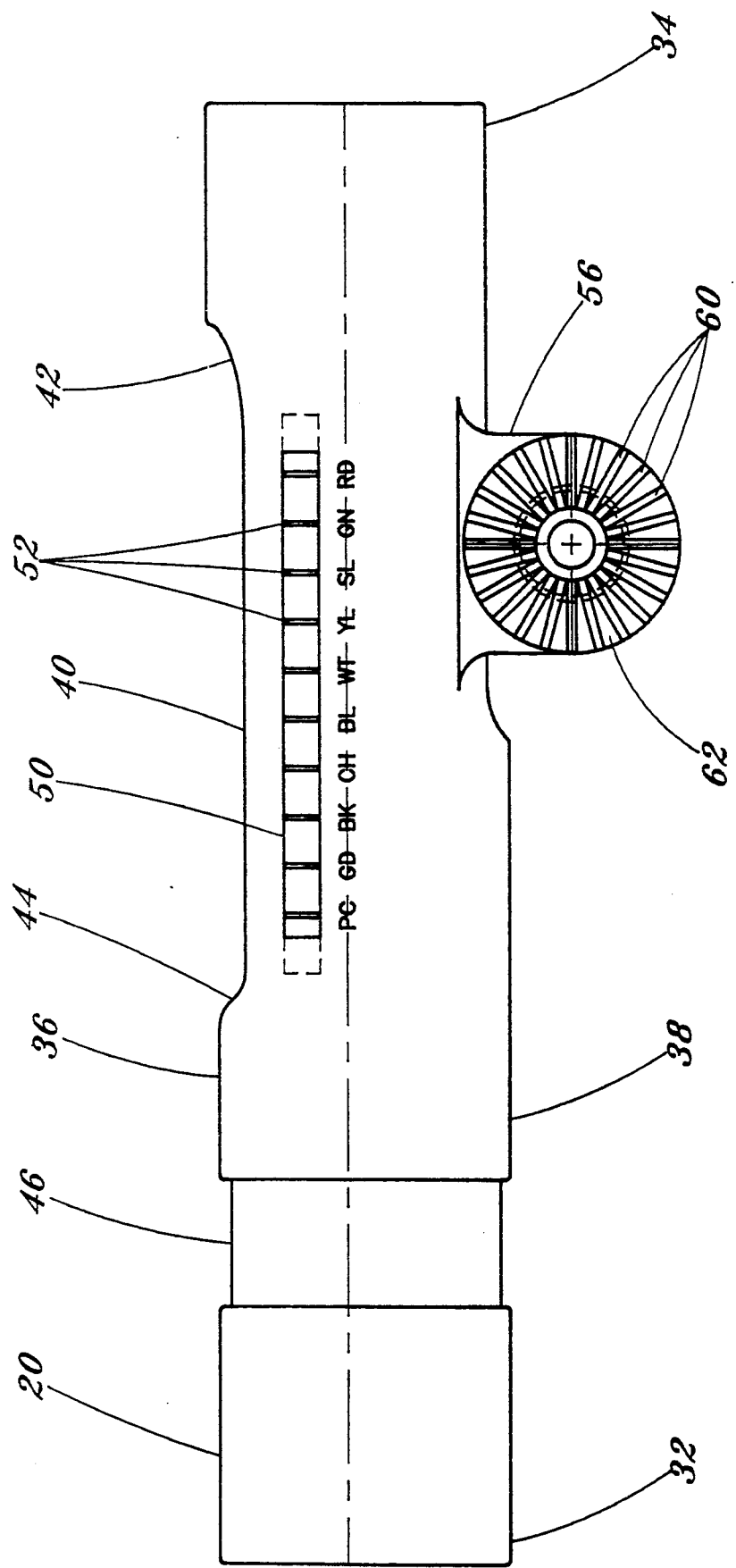
FIG. 3 is a fragmentary, somewhat greatly enlarged, left side elevation view of the tube member of the present invention.
Figure 11:
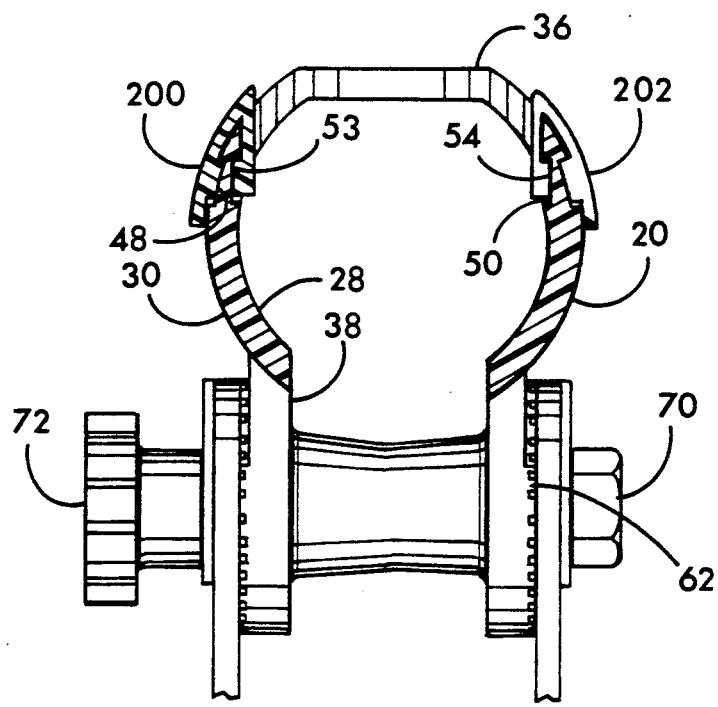
FIG. 11 is a fragmentary vertical sectional view of the tube member of the present invention taken from position along line 11—11 of FIG. 1.

As best seen by reference to FIGS. 2 and 3, the tube member 20 has formed therein a plurality of rectangular depressions 48 and 50 in the outside boundary 30 that are disposed in a longitudinal orientation and that extend between the steps 42 and 44 and on opposite sides of the slot 40. Each of the depressions 48 and 50 have a plurality of parallel grooves 52 that are substantially transverse to the longitudinal orientation of the depressions 48 and 50. Below each of the grooves 52 and fixed to the outside boundary 30 are raised characters that correspond to each such groove 52. The characters beneath the depression 48 are numerical, for example, "20", "40", "60", "80", "100", "120", "140", "160", "180", and "200" are shoWn in the right side elevation view of the assembled fishing rod holder of FIG. 2. FIG. 3 is a left side elevational view of the tube member 20 and shows the depression 50. Below each of the grooves 52 of the depression 50 are raised characters that correspond to each such groove 52 that is formed in the outside boundary. The characters located beneath the rectangular depressions 46 are alphabetical, for example, "PC", "GD", "BK", "CH", "BL", "WT", "YL", "SL", "GN", and "RD". The significance of the alpha-numeric characters positioned beneath the rectangular depressions 48 and 50 is explained in greater detail hereinafter. As best seen by reference to FIG. 11, the rectangular depressions 48 and 50 are each substantially radially opposed by longitudinal depressions 53 and 54, respectively, and which are positioned in the bore 28 of the tube member 20.

Figures 4A, 4B:
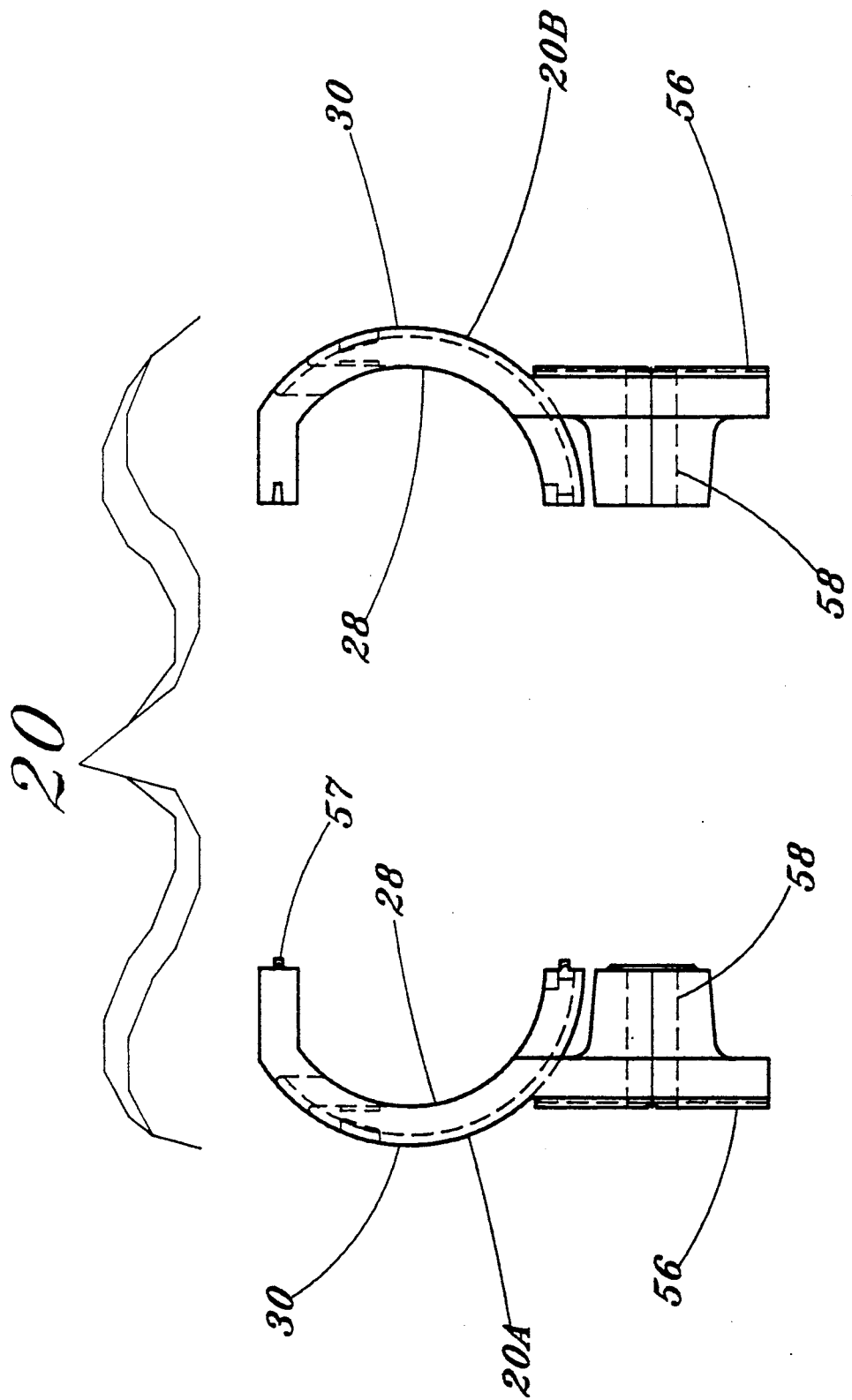
FIG. 4A and 4B are exploded end views of the left and right side of the tube member of the present invention.
Figure 5A:
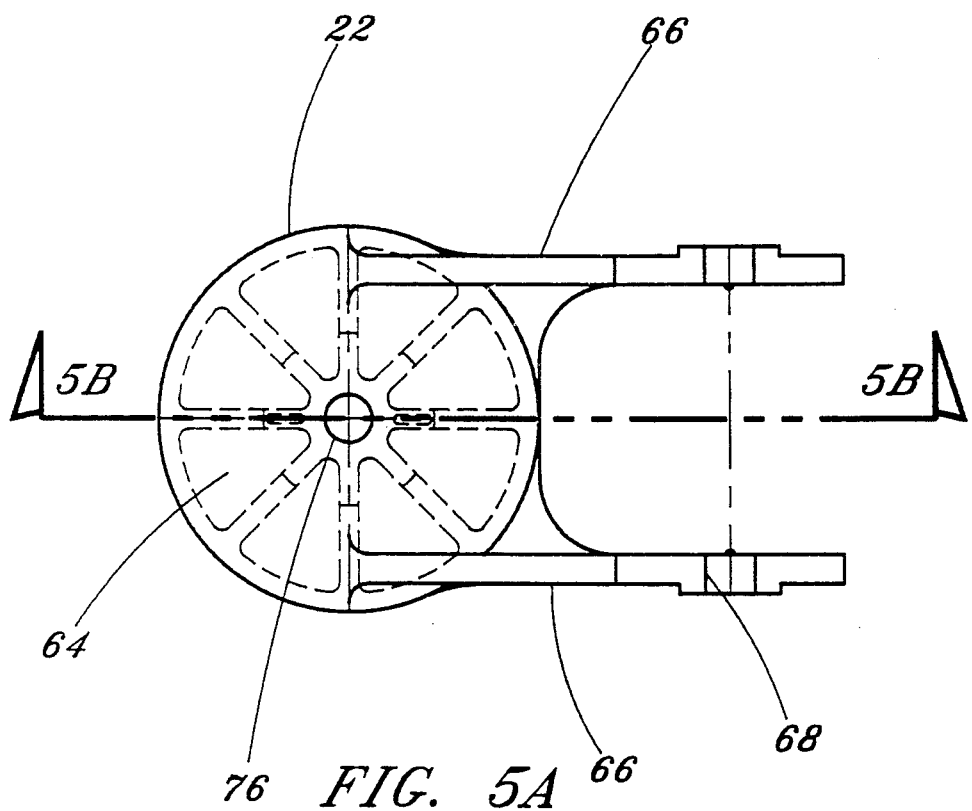
FIG. 5A is a top plan view of the support member of the fishing rod holder of the present invention.
Figure 5B:
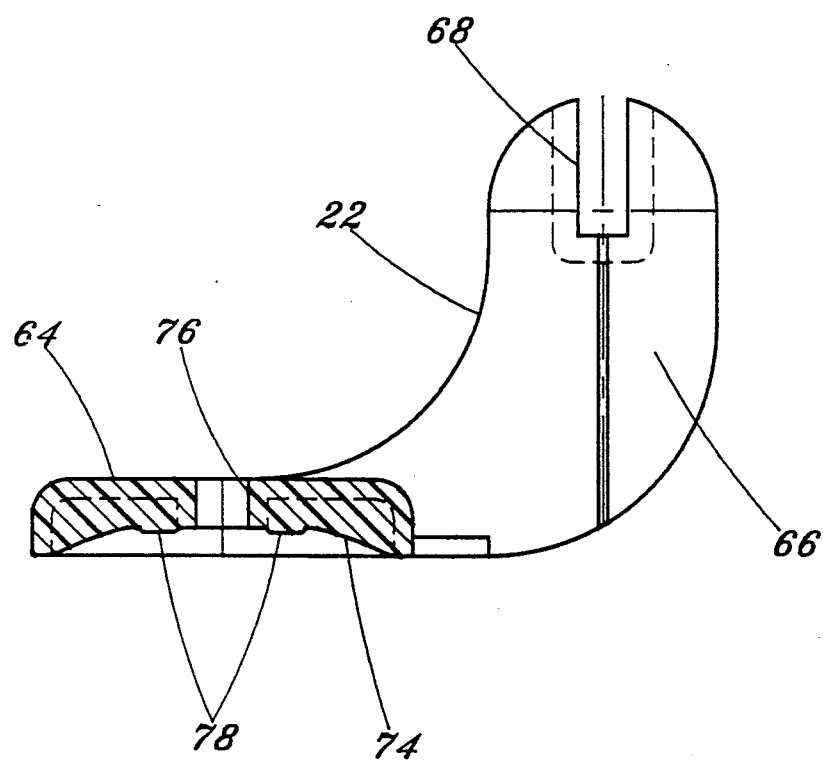
FIG. 5B is a side elevation view, partially in vertical cross-section, of the support member of the present invention taken from a position along line 5B—5B of FIG. 5A.
Figure 6B:
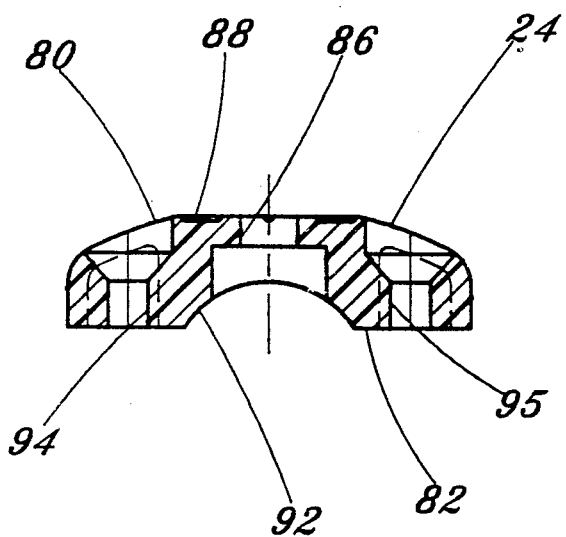
FIG. 6B is a vertical sectional view taken from a position along line 6B—6B of FIG. 6A.
Figure 6A:
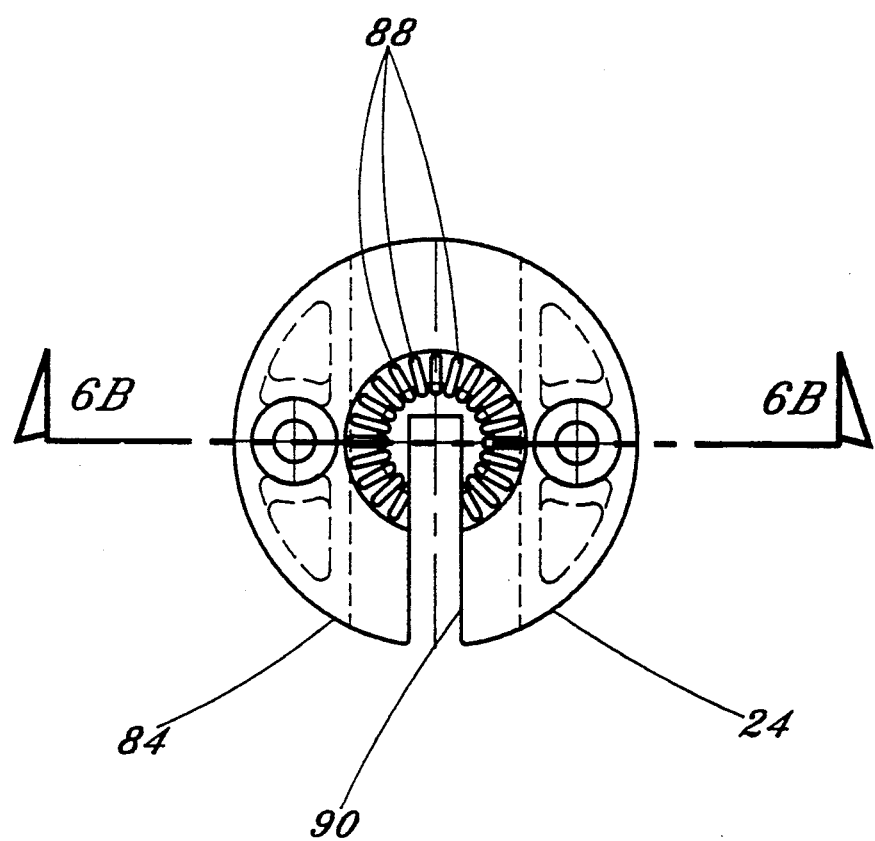
FIG. 6A is a top plan view of the spacer of the fishing rod holder of the present invention.

The tube member 20 is preferably molded from two separate longitudinally oriented sections 20A and 20B, respectively, and which are shown in FIGS. 4A and 4B. The section 20A is the left longitudinal half and the section 20B is the right longitudinal half. In the assembly of the tube member 20, the sections 20A and 20B are substantially aligned in registry or disposed in mating relation by pins 57 that are made integral with the section 20A and that mate with apertures (not shown) that are formed in the section 20B. Suitable materials for the tube member 20 include styrene, ABS, and polycarbonate. The individual sections 20A and 20B may be fastened together by a number of techniques including sonic welding.

As best seen by reference to FIGS. 4A and 4B, the outside boundary 30 of the tube member 20 has made integral therewith a pair of brackets 56 that extend outwardly from the underside 38 of the tube member 20 and in substantially parallel relation one to the other. An aperture is formed in each bracket and extends substantially transversely relative to the bore 28 of the tube member 20. The apertures 58 are substantially coaxially aligned one with the other. The brackets 56 further have a plurality of substantially radially disposed grooves 60 that extend outwardly from each of the apertures 58 thereby forming a 25 substantially serrated surface 62. The tube member 20 is mounted on the support member 22 and disposed in pivoting relation thereto at the apertures 58 of the brackets 56.

The support member 22 is depicted in FIGS. 1, 2, 5A, and 5B. The support member 22 includes a base or foot 64 and two arms 66 that extend substantially upwardly therefrom and in generally parallel relation one to the other. At the ends opposing the foot 64, the arms 66 each have a socket or a channel 68. In an assembled configuration, the arms 66 are positioned outside the brackets 56 and the sockets 68 and the apertures 58 of the brackets 56 are substantially coaxially aligned to allow the insertion of a pivot pin 70 therethrough such that the tube member 20 may be rendered pivotable about the pivot pin 70. This, of course, permits the tube 20 to be adjusted relative to altitude or angle of the tube member 20 in the vertical plane. The pivot 70 may be a bolt or like member that threadably engages with a nut 72 or similar hand manipulatable fasteners such that it may be readily loosened to enable pivoting of the tube member 20 and tightened to secure the tube member 20 at the desired position. The threadable advancement of the nut 72 relative to the pin 70 causes the nut to urge the brackets 56 into frictional engagement against the arms 66 of the support member 22. More particularly, the nut 72 causes the serrated surface 62 that is formed by the radial grooves 60 into a position whereby it assists such frictional engagement. The foot 64 of the support member 22 has a concave-shaped bottom 74 and a centrally disposed aperture 76. The bottom 74 of the foot 64 has made integral therewith a plurality of ribs 78 that are disposed in substantially radially extending orientation relative to the aperture 76. In an assembled relationship, the bottom of the foot 64 is mounted or rested upon the spacer 24.

The spacer 24 is best depicted in FIGS. 1, 2, 6A and 6B. The spacer has a convex-shaped top surface 80 and a bottom surface 82, a circumferential or peripheral boundary 84 and a centrally disposed aperture 86 that extends substantially centrally and axrally from the top surface 80 to the bottom surface 82. The top surface 80 of the spacer 24 has made integral therewith a plurality of substantially cylindrically shaped dimples 88 that are disposed in a substantially radial orientation about the aperture 86. Further, a notch 90 is formed in the spacer 24 that extends substantially radially inwardly from the circumferential boundary into intersecting relation relative to the centrally disposed aperture 86. The bottom surface 82 of the spacer 24 has a substantially cylindrically shaped section 92 formed therein and which is oriented, or substantially aligned, with the notch 90. The aperture 86 converges with the cylindrical section 92. Two apertures 94 and 95 extend substantially axially through the spacer 24. Each of the apertures 94 and 95 flanks the cylindrical section 92 on opposite sides of the spacer 24 and is disposed in diametrically opposite positions one to the other. The convexly curved shape of the top surface 80 of the spacer 24 is configured in a fashion so as to conformably mate with the concavely curved shape of the bottom surface 74 of the foot 64. In an assembled configuration, the aperture 76 of the support member 22 is substantially coaxially aligned with the aperture 86 of the support member 22, thereby allowing a bolt 97 to be inserted therethrough such that the tube member 20 may be rendered selectively pivotable about the bolt 97. This permits adjustment of the angle of the tube member 20 in the horizontal plane. The bolt 97 threadably engages a hand manipulatable nut 98 that may be selectively loosened to enable pivoting of the tube member 20 and thereafter tightened to secure the tube member 20 at a desired position. The tightening of the nut 98 causes the frictional engagement of the concavely-shaped bottom surface 74 of the foot 64 against the convexly shaped top surface 80 of the spacer 24. Further, and upon tightening of the nut 97, the dimples 88 are adapted to receivably mate with the rib 78 thereby assisting or otherwise enhancing or facilitating such frictional engagement. In an assembled configuration, the bottom of the spacer 24 rests upon and is mounted to the clamp 26.

FIGS. 7A, 7B, and 7C illustrate the clamp 26 divorced from the fishing rod holder 10. The clamp 26 comprises a base 100, a first platen 102, and a second platen 104. The base 100 has an outer margin or peripheral edge 106 that is substantially rectangularly shaped and which includes a first edge 108, a second edge 110 that is parallel to the first edge 108, and which is further in transverse opposition thereto; and third and fourth edges 112 and 114 that are substantially parallel to each other and substantially perpendicular to the first and second edges 108 and 110. The base 100 further includes a top surface 116, the boundary of which is defined by the outer margin 106, and a bottom surface 118 that opposes the top surface 116 and Which is adapted to set or rest upon the gunwale 12 or like surface of the boat The base 100 further includes apertures 120 and 122; respectively, that communicate between the top and bottom surfaces 116 and 118, respectively, the apertures 120 and 122 substantially longitudinally opposing each other or otherwise disposed along the longitudinal axis of the clamp 26. The top surface 116 of the base 100 includes an elevated step 124 that is positioned between the holes 120 and 122 and which extends between the third and fourth edges 112 and 114. Moreover, the bottom surface 118 has formed therein a substantially rectangularly shaped and depressed section 126 and which is positioned between the apertures 120 and 122. The section 126 extends between the third and fourth edges 112 and 114, respectively. A depressed and substantially cylindrically shaped section 128 is formed in the rectangular section 126 and opposes the step 124. The section 128 extends between the third and fourth edges 11 and 114, respectively. The bottom surface 118 further includes channels 130 and 132 that are disposed in substantially parallel relation relative to the first and second edges and transversely to the longitudinal axis, the channel 130 located between the aperture 120 and the first edge 108; and the channel 132 being located between the aperture 122 and the second edge 110. The bottom surface 118 is operable to rest or set upon the gunwale or like surface during the mounting of the fishing rod holder 10 and such mounting is explained in further detail hereinafter. As should be understood, the configuration of the bottom surface 118 permits the base 100 to rest in contact with, or otherwise be set upon gunwales or other surfaces of various shapes and configurations. Further, this shape facilitates the operation of the clamp 26 in that when the clamp 26 is properly employed, it substantially eliminates any rocking motion in same. The first platen 102 is attached to or made movably integral with the firs edge 108 of the base 100 at a first hinge 134 and the second platen 104 is attached to or otherwise made movably integral with the second edge 110 of the base 100 at a second hinge 136. The clamp 26, which includes the base 100, the first platen 102, the second platen 104, first hinge 134, and second hinge 136, is preferably molded of a single integral piece. A suitable material for use in molding the clamp 26 includes polypropylene.

The first platen 102 has an interior facing surface 138 and an exterior facing surface 140. Further, the first platen 102 has an elongated aperture 142 formed therein that communicates between the interior surface 138 and the exterior surfac 140. As best understood by a study of FIG. 2 and when the first platen 102 is folded at the first hinge 134, the aperture 142 of the first platen 102 substantially aligns with the aperture 120 which is formed in the base 100. Furthermore, the elongated nature of the aperture 142 allows the first platen 102 to be folded along a certain range of movement while simultaneously maintaining the aperture 142 in alignment with the aperture 120. The interior surface 138 includes two parallel pads 144 and 146, respectively, that are each substantially parallel to the first edge 108 and that further oppose each other relative to the aperture 142. The individual pads 144 and 146 have contact surfaces that engage a side of the gunwale or like surface upon which the clamp 26 and the fishing rod holder 10 are to be mounted. The second platen 104 is a mirror image of the first platen 102 and has an analogous interior surface 148, exterior surface 150, aperture 152, and pads 154 and 156, respectively. The second platen 104 operates in the same manner as the first platen 102 and therefore, for the sake of brevity, is not discussed in further detail herein.

FIGS. 1 and 2 illustrate the fishing rod holder 10 of the present invention as assembled upon a gunwale or like surface of a boat, the gunwale being generally rounded in its overall configuration. The assembly of the fishing rod holder 10 is as follows. The bottom surface of the base 100 of the clamp 26 is selectively positioned in a desired location upon the top surface of the gunwale. The bottom surface 82 of the spacer 24 is positioned in rested relation upon the top surface 116 of the base 100 of the clamp 26 such that the step 124 fits within the cylindrically shaped section 92. Further, the first and second platens 102 and 104 are thereafter collapsed about the opposing sides of the gunwale by flexure of the first and second hinges 134 and 136, respectively. A first bolt 158 is inserted through the coaxially aligned apertures 94 of the spacer 24, the first aperture 120 of the base 100, and the aperture 142 of the first platen 102; and a second bolt 160 is inserted through the coaxially aligned aperture 95 of the spacer 24, the second aperture 122 of the base 100, and the aperture 152 of the second platen 104. As earlier discussed and as a direct function of the elongated nature of the apertures 142 and 152, the clamp 26 may accommodate gunwales of different cross-sectional or transverse dimensions. Moreover, the first and second bolts 158 and 160 engage nuts 162 and 164. The threadable advancement of the bolts 158 and 160 relative to the nuts 162 and 164, respectively, has the effect of drawing the pads 144 and 146 of the first platen 102 tightly against one side of the gunwale and the pads 154 and 156 against the opposing side of the gunwale. In the foregoing fashion, the clamp 26 and the spacer 24 are thus releasably secured to each other upon the gunwale or like surface without mechanically altering the gunwale. Such attachment is not permanent inasmuch as the clamp 26 may be easily removed by threadably disengaging the nuts 162 and 164 from the bolts 158 and 160. Such attachment does not mar the surface of the boat because the attachment is not permanent and because the clamp 26 is made of polypropylene or other similar synthetic polymeric materials that will not scratch, dent or otherwise deface the surface of the gunwale.

The support member 22 is pivotably attached to the spacer 24 by the bolt 97 and the nut 98. In this regard, the head of the bolt 97 is received in the notch 90 and within the cylindrical section 92. The bolt 97 is slideably received within the aperture 86. This is best illustrated in FIG. 2. The support member 22 is then positioned in rested relation on or surmounted to the spacer 24 such that the bolt 97 extends through the first aperture 76 that is formed in the foot 64. The nut 98 is then threadably advanced along the bolt 97 and into a tightened position thereby securing the support member 22 to the spacer 24. As noted above, the bolt 97 may be loosened by hand to enable the user of the device to pivotally position the tube member 20 in any selected position relative to the horizontal.

The tube member 20 is next attached to the support member 22 by positioning the brackets 56 of the tube member 20 in a position outside of the arms 66 of the support member 22 and thereafter substantially coaxially aligning the apertures 58 of the brackets with the sockets 68 that are formed in the arm 66 of the support member 22. As earlier discussed, the pivot pin 70 is inserted through the coaxially aligned apertures 58 and the sockets 68 and is thereafter threadably engaged by the nut 72 The pivot pin 70 may be loosened by hand to enable the user of the device to pivot the tube member 20 to any selected angle relative to the vertical plane.

Figure 8:
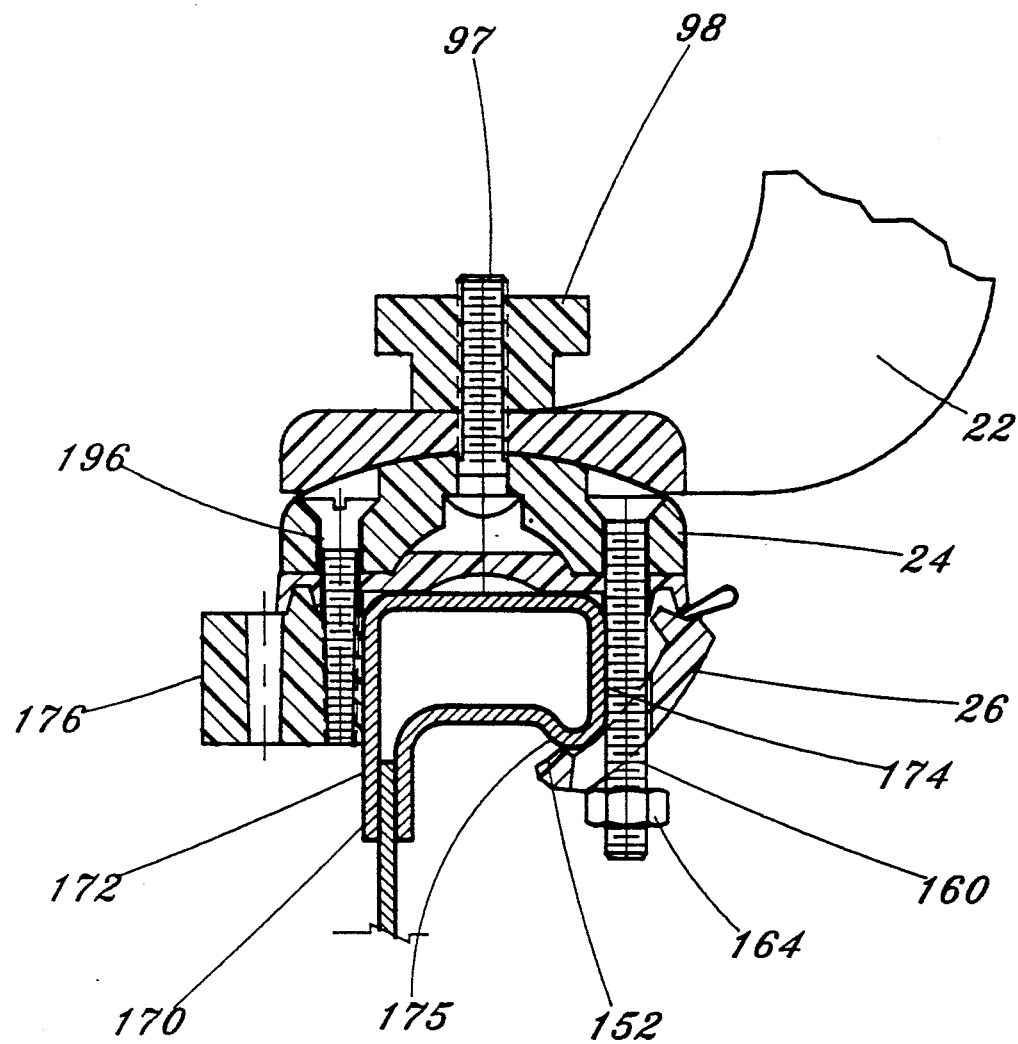
FIG. 8 is a fragmentary, vertical sectional view of a portion of the support, spacer, clamp and block in an alternate assembled relationship corresponding to the mounting of the clamp to the gunwale of a different configuration.
Figure 9B:
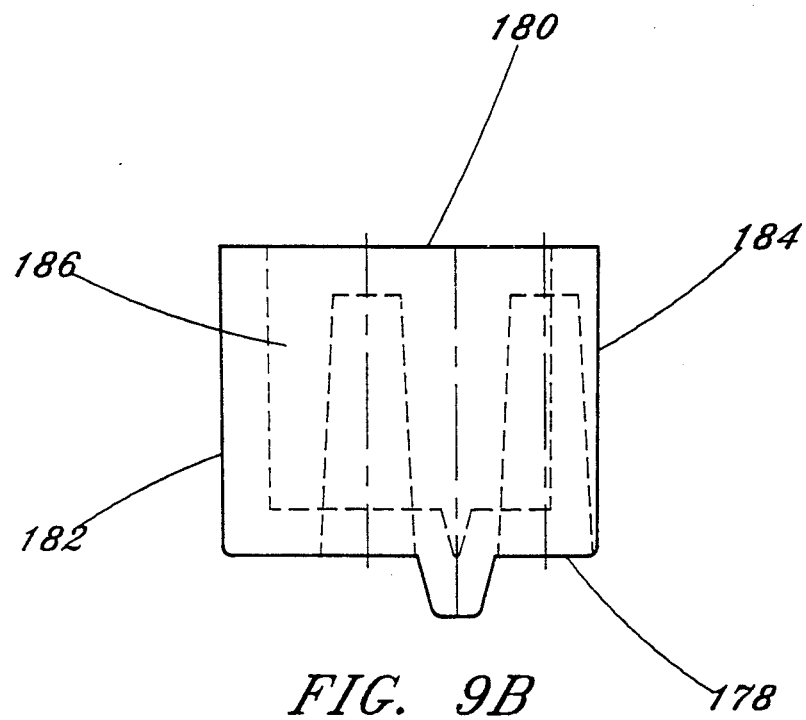
FIG. 9B is a side elevation vrew of the block employed in the assembly shown in FIG. 8.
Figure 9A:
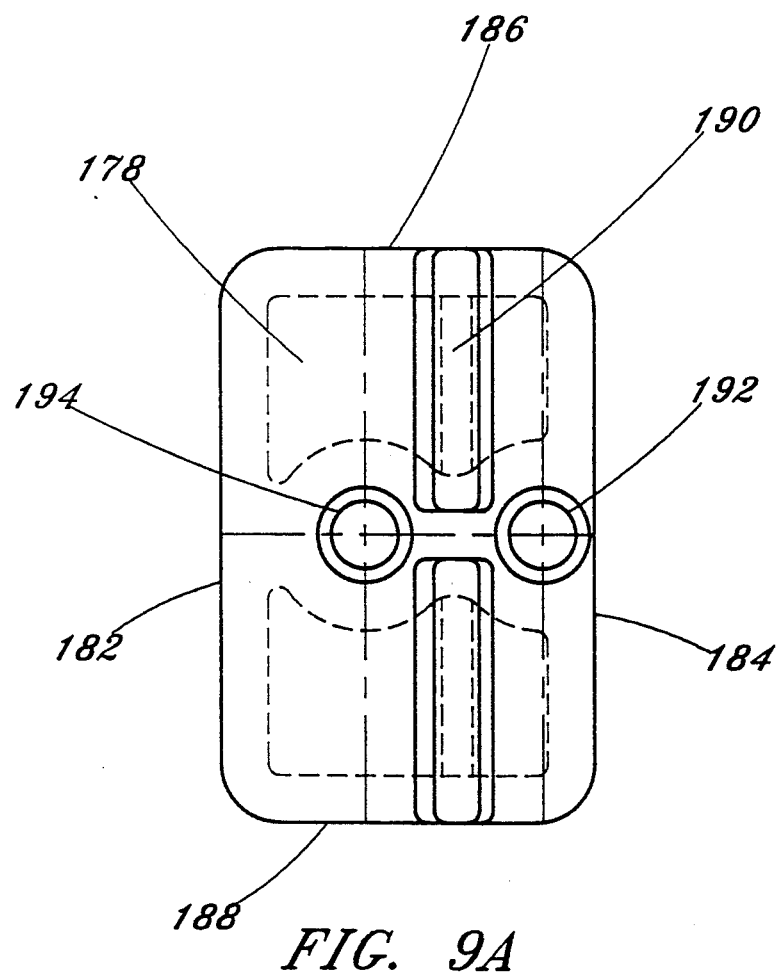
FIG. 9A is a top plan view of the block employed in the assembly shown in FIG. 8.

FIG. 8 illustrates a fragmentary view of the mounting of the fishing rod holder 10 to a gunwale 170 that has an alternate configuration. In this regard, the gunwale 170 has an interior facing surface 172 and an exterior facing surface 174 that are substantially parallel to each other. The exterior facing surface 172 is formed to extend downwardly for a given length and then curve under to form a lip 175. In the attachment of the fishing rod holder 10 to a gunwale or like surface configured as illustrated, the invention provides a block 176 that is best depicted by reference to FIGS. 9A and 9B. As shown therein, the block 176 is generally rectangular in its overall configuration, having a top surface 178, a bottom surface 180, and side walls 182, 184, 186, and 188, respectively. The top surface 178 of the block 176 includes a tooth 190 that extends upwardly therefrom along its length and is disposed in substantially parallel relation to the side walls 182 and 184, respectively. The tooth 190 is adapted to conformably mate with and engage one of the channels 130 or 132, respectively. The tooth 190 is located in a position closest to the side wall 184. The top surface 178 of the block 176 also includes a pair of apertures 192 and 194, respectively, that extend a predetermined distance into the block 176. The apertures 192 and 194 are individually positioned on opposite sides of the tooth 190. In use, the block 176 and more particularly the tooth 190, is adapted to conformably engage the channel 130 and a screw 196 is inserted through the aperture 94 of the spacer, the first aperture 120 of the base 100, and into the aperture 192 of the block 176. The screw 196 threadably engages the wall of the block 176 which defined the aperture 192 of the block 176 in a self-tapping manner. The side wall 184 forms a rigid substantially non-flexible surface that substantially conforms to and abuts against the exterior facing surface 174 of the gunwale 170. Further, the pad 152 of the second platen 104 conformably fits under or engages the lip 175, and the subsequent tightening of the bolt 160 draws the interior surface 148 of the second platen 104 into secure frictional engagement against the exterior facing surface 174 of the gunwale 170. In the arrangement shown in FIG. 8, the first platen 102 is not employed inasmuch as its function is replaced by the block 176. For gunwales 170 that may have narrower widths, the block 176 may be turned into a position opposite to that which is shown in FIG. 8 such that the side wall 183 abuts in juxtaposed relation against the interior facing surface 174, the side wall 182 forming a rigid substantially non-flexible surface that substantially conforms to the exterior facing side 174 of the gunwale 170. Because the clamp 26 is symmetrical and the first and second platens 102 and 104 are mirror images of each other, the block 176 may, at the discretion of the user, be used in place of the second platen 104 as opposed to the first platen 102 as discussed above. In this arrangement, the tooth 190 of the block 176 would engage or mate with the channel 132, and the pad 142 of the first platen 102 would frictionally engage the gunwale 170 in a position under the lip 17 thereof.

Markers 200 and 202 are employed to assist the user of the present invention in recalling predetermined fishing variables associated with a given fishing rod that is used in association with the fishing rod holder 10. The markers 200 and 202, respectively, are best seen by reference to FIGS. 12A and 12B, respectively. Each of the markers 200 and 202 have a first leg 204 and a second leg 206 that are joined at a fold or apex 208. The first leg 204 has an inside facing surface 210 and an outside facing surface 212 which individually oppose each other. The inside facing surface 210 further has a protrusion or detent 214 that is dimensioned to conformably mate with one of the plurality of rectangular depressions 48 or 50 that are formed in the outside boundary 30 of the tube member 20. The detent 214 further has a verticle rib 216 that is dimensioned to conformably mate with the individual grooves 52. The outside surface 212 of 5 the markers 200 and 202 each terminate at a point or apex 218. The second leg 206 also has a detent 218 that is conformably dimensioned to slidably mate with the individual rectangular depressions 53 or 54 that are formed in the bore 28. The individual marker 200 is located within the longitudinal slot 40 such that the detent 214 slidably engages the rectangular depression 48 that is formed in the outside boundary 30, and the detent 218 slidably engages the rectangular depression 53 that is positioned in the bore 28. The slidable engagement of the detents 214 and 218 with the rectangular depressions 48 and 53 allows the marker 200 to be selectively moved up and down along the tube member 20 to different positions, such sliding movement, however, is constrained by the boundaries of the depressions 48 or 53. The sliding of the marker 200 to different positions within the longitudinal slot 40 indexes the point 218 relative to the individual numerical characters or indicia that are formed in the outside boundary 30. As earlier discussed, a plurality of numerals are formed in the outside boundary and these numerals represent the different water depths at which a selective lure, not shown, has been set for the fishing rod that is used in association with the fishing rod holder 10. The user may, of course, slide the marker 200 to selective different locations accordingly for later reference. Thus, if the user of the fishing rod holder 10 is finding success at a particular depth, the user may recall such depth by checking the marker 200 and thereafter adjusting the other fishing rod holders accordingly to maximize their individual fishing success. Upon sliding the marker 200 to a location where it points to a particular indicium, the marker 200 will releasably snap into place by engagement of the rib 216 with one of the grooves 52 which directly correspond with a selected indicium. The rib 216 may be liberated and indexed from one of the grooves 52 and slid to another indicium by applying physical force against the marker 200. This physical force has the effect of distorting or flexing the first leg 204 in such a fashion wherein the detent 216 moves out of mating engagement relative to one of the grooves 52 thereby permitting the sliding movement of the marker along the tube member 20.

The marker 202 is located within the longitudinal slot 40 such that the detent 214 slidably engages the rectangular depression 50 that is formed in the outside boundary 30 and the detent 218 slidably engages the rectangular depression 54 that is formed in the bore 28. The marker 202 operates in the same fashion as the marker 200 except that the marker 202 indexes to a different set of indicia in the outside boundary 30. As earlier discussed, the set of indicia formed in the outside boundary of the tube may be used to indicate a different set of fishing variables. For example, the alphabetic indicia indicate fishing lure colors, for example, "BK" may represent black, "BL" may represent blue, "WT" may represent white, "YL" may represent yellow, "SL" may represent silver, "GN" may represent green, "RD" may represent red, etc. Thus, if the user of the fishing rod holder 10 is finding success with a particular lure, the user may recall such lure by checking the marker 202 and thereafter adjusting the other fishing rod holders accordingly. It is to be understood that the fishing rod holder 10 may be marked with different indicia that represent different representations or sets of variables that may be desired to be recalled by a user, and that the invention is not restricted to the particular representation of variables as herein described.

Figure 10:
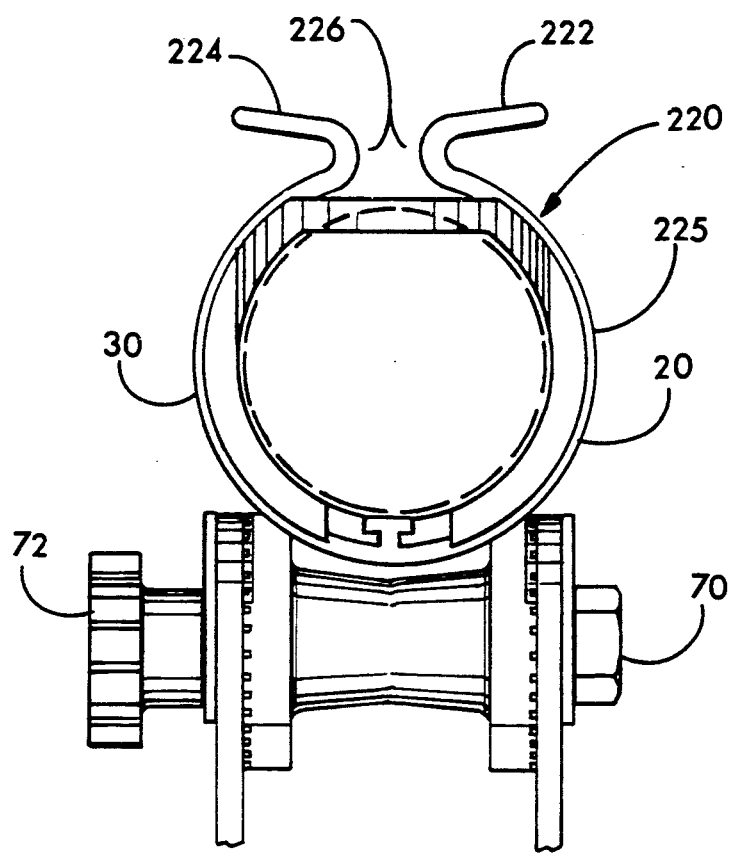
FIG. 10 is a fragmentary end view of the tube member of the present invention taken from a position along line 10—10 of FIG. 1.

The fishing rod holder 10 also incorporates a retainer clip 220 that matingly snap-fits within the circumferential notch 46. The retainer clip 220 closely fits about the circumference of the outside boundary 30 and terminates in two tabs 222 and 224, respectively, in the region of the longitudinal slot 40. The tabs 222 and 224 may be separated by hand to enable the user to insert a fishing rod into the fishing rod holder 10 through the longitudinal slot 40. As best seen by reference to FIG. 10, the retaining clip 220 has a main body 225 that is generally round but substantially discontinuous, that is, the retainer clip 220 defines an opening 226 which is disposed in substantial registry with the tube member 20. The retaining clip 220 is manufactured from resilient material that will flex or otherwise deform when force is applied thereto.

It is to be understood that the fishing rod holder 10 of the present invention is not restricted to use on a gunwale of a boat, but may be mounted to other surfaces of a boat, and even to surfaces not immediately associated with a boat. It should also be understood that the clamp 26 may be employed with accessories other than fishing rod holders, and may be mounted to surfaces that are not necessarily associated with a boat. It is further understood that the invention is not confined to the particular construction and arrangement of parts herein illustrated and described, but embraces such modified forms thereof as may come within the scope of the following claims.

Having described our invention, what we claim as new and desire to secure by letters patent is:

1. A fishing rod holder for use in a boat having a gunwale or like surface with first and second opposing sides that may be variously configured, the fishing rod holder removably mounting on the gunwale and comprising:

(a) a clamp removably mounted on the gunwale, and including:

(i) a base having a top surface and a bottom surface that opposes the top surface, the bottom surface resting upon the gunwale of the boat;

(ii) a first platen having interior and exterior surfaces and which is affixed on the base by a first hinge, the first platen folding at the first hinge such that the interior surface of the first platen rests in substantially juxtaposed relation against the first side of the gunwale;

(iii) a second platen having interior and exterior surfaces and which is affixed on the base by a second hinge, the second platen folding at the second hinge such that the interior surface of the platen rests in substantially juxtaposed relation against the second side of the gunwale; and (b) a tube member mounted on the clamp and having a bore defined by an inside diameter which is dimensioned to receive a fishing rod therewithin.

2. A fishing rod holder as claimed in claim 1 and wherein the base has a longitudinal line of reference and further has first and second apertures that communicate between the top and bottom surfaces and that are disposed in predetermined positions along the longitudinal line of reference, and wherein the first and second platens include individual apertures which communicate between the interior and exterior surfaces thereof and wherein movement of the first and second platens to predetermined positions causes the individual apertures formed in the base to be disposed in substantially coaxial alignment with the individual apertures formed in the first and second platens and wherein a first bolt slidably extends through the first aperture formed in the base and the aperture formed in the first platen when the individual apertures are disposed in substantially coaxial alignment thereby securing the first platen against the first side of the gunwale, and wherein a second bolt slidably extends through the second aperture formed in the base and the aperture formed in the second platen when the individual apertures are disposed in substantially coaxial alignment thereby securing the second platen against the second side of the gunwale.

3. A fishing rod holder as claimed in claim 1 and wherein the tube member includes a bracket that has an aperture formed therein and that is disposed in substantially transverse relation relative to the bore of the tube member, and wherein a support member is disposed between the clamp and the tube member and which includes a foot that is mounted on the clamp and an arm that extends substantially upwardly therefrom, the arm having a socket that is operable to be substantially aligned with the aperture formed in the bracket, and wherein a pivot pin is inserted through the coaxially aligned socket of the arm and the aperture of the bracket such that the tube member may be rendered pivotable about the pivot pin and selectively adjustable in the vertical plane.

4. A fishing rod holder as claimed in claim 1 and wherein a support member extends between the clamp and the tube member, the support member having a foot with an aperture formed therein and that is mounted on the clamp, and an arm is affixed on the foot and extends upwardly therefrom and is mounted on the tube member and wherein a spacer is positioned between the foot of the support member and the clamp, the spacer having an aperture that is substantially coaxially aligned with the aperture formed in the foot of the support, and wherein a pivot pin that is inserted through the coaxially aligned aperture of the foot and the aperture of the spacer such that the support member may be rendered pivotable about the pivot pin and selectively adjustable in the horizontal plane.

5. A fishing rod holder as claimed in claim 1 and wherein the base, first platen, first hinge, second platen, and second hinge of the clamp are formed as an integral piece.

6. A fishing rod holder as claimed in claim 5 and wherein the clamp is made of polypropylene.

7. A fishing rod holder as claimed in claim 1 and wherein the tube includes an outside boundary which is marked with a plurality of indicia that represent fishing variables that are to be monitored, and wherein a marker is slidably mounted on the tube member and is adapted to be indexed to a particular indicium by a user in order to recall the variable represented by a particular indicium at a later time.

8. A fishing rod holder for use in a boat having a gunwale or like surface with first and second opposing sides that, may be variously configured, the fishing rod holder removably mounting on the gunwale and comprising:

(a) a clamp removably mounted on the gunwale and including:

(i) a base having a top surface and a bottom surface that oppose the top surface, the bottom surface resting upon the gunwale of the boat;

(ii) a platen having interior and exterior surfaces, the platen attached along an edge of the base by a hinge and operable to fold along the hinge such that the interior surface of the platen rests in substantially juxtaposed relation against the first side of the gunwale;

(iii) a block that matingly engages and depends from the bottom surface of the base, the block having a side wall that defines a rigid surface that substantially conforms to and rests in substantially juxtaposed relation against the second side of the gunwale; and (b) a tube member that is mounted on the clamp, the tube having a bore defined by an inside diameter that is dimensioned to allow insertion of a fishing rod therewithin.

9. A fishing rod holder as claimed in claim 8 and wherein the base has an aperture that communicates between the top and bottom surfaces thereof, and wherein the platen has an aperture that communicates between the interior and exterior surfaces of the platen such that when the aperture of the base is disposed in substantially coaxial alignment with the aperture of the platen, the platen is folded at the hinge and positioned in juxtaposed rested relation against the first side of the gunwale, and wherein a bolt extends through the coaxially aligned apertures formed in the base and the platen thereby securing the platen against the first side of the gunwale.

10. A fishing rod holder as claimed in claim 8 and wherein the tube member includes a bracket that has an aperture that is positioned substantially transversely relative to the bore of the tube member, and wherein a support member is mounted between the clamp and the tube member, the support member including a foot that is releasably mounted on the clamp and an arm that is mounted on the foot and that extends upwardly therefrom, the arm having a socket that is adapted to substantially align with the aperture formed in the bracket and wherein a pivot pin is inserted through the coaxially aligned socket which is formed in the arm and the aperture formed in the bracket such that the tube member may be rendered pivotable about the pivot pin and selectively adjustable in the vertical plane.

11. A fishing rod holder as claimed in claim 8 and further including:
   (a) a support member that extends between the clamp and the tube member, the support member having a foot with an aperture formed therein and that is releaseably attached on the clamp and wherein an arm is mounted on the foot and extends upwardly therefrom and which is mounted on the tube member;
   (b) a spacer positioned between the foot of the support member and the clamp, the spacer having an aperture that is adapted to be substantially aligned with the aperture that is formed in the foot of the support;
   (c) a pivot pin inserted through the coaxially aligned apertures of the foot and the spacer such that the support member may be rendered pivotable about the pivot pin to adjust the tube member in the horizontal plane.

12. A fishing rod holder as claimed in claim 8 and wherein the base, platen, and hinge of the clamp are formed as an integral piece.

13. A fishing rod holder as claimed in claim 12 and wherein the clamp is manufactured from polypropylene.

14. A fishing rod holder as claimed in claim 8 and wherein the tube member includes an outside boundary which is marked with a plurality of indicia that represent fishing variables that are to be monitored, and wherein the fishing rod holder further includes a marker that is mounted on a tube member and which may be indexed to a particular indicium by a user in order to recall the variable represented by a particular inqicium at a later time.

15. A kit that may be assembled to form a fishing rod holder for use in a boat having a gunwale or like surface with first and second opposing sides that may be variously configured, the fishing rod holder removably mounting on the gunwale and comprising:
   (a) a clamp that removably mounts on the gunwale, and which includes:
      (i) a base having an outer margin that defines first and second edges that longitudinally oppose each other, a top surface the boundary of which is defined by the outer margin, and a bottom surface that opposes the top surface and that rests upon the gunwale of the boat;
      (ii) a first platen having an interior surface and an exterior surface, the first platen being mounted on the first edge of the base by a first hinge and the first platen folding at the first hinge such that the interior surface of the first platen rests in substantially juxtaposed relation against the first side of the gunwale;
      (iii) a second platen having an interior surface and an exterior surface, the second platen being mounted on the second edge of the base by a second hinge and the second platen folding at the second hinge such that the interior surface of the platen may abut against the second side of the gunwale; and
   (b) a block that is adapted to matingly engage and depend from the bottom surface of the base at the second end thereof and having a side wall that forms a rigid surface that conforms to the shape of the second side of the gunwale, the block being substituted in place of the second platen and disposed in abutting relation against the second side of the gunwale; and
   (c) a tube member that is mounted on the clamp, the tube member having a bore defined by an inside diameter that is dimensioned to permit insertion of the fishing rod therewithin.

16. A kit as claimed in claim 15 and wherein the bottom surface of the clamp has a channel formed therein and wherein the block includes a tooth which is operable to matingly engage the channel.

17. A kit as claimed in claim 16 and wherein the base has an aperture that communicates between the top and bottom surfaces thereof, and wherein the first platen has an aperture that communicates between the interior surface of the first platen and the exterior of the first platen and wherein the aperture of the base is disposed in substantially coaxial alignment with the aperture of the first platen, and the first platen is folded at the first hinge and abuts against the first side of the gunwale and wherein the fishing rod holder further includes a bolt that extends through the coaxially aligned apertures of the base and the first platen thereby securing the first platen against the first side of the gunwale.

18. A kit as claimed in claim 17 and wherein the base has a second aperture that communicates between the top and bottom surfaces thereof, and wherein the second platen has an aperture that communicates between the interior and exterior surfaces of the second platen and wherein when the second aperture of the base is disposed in substantially coaxial alignment with the aperture of the second platen, the second platen is folded at the second hinge and abuts against the second side of the gunwale, and wherein the fishing rod holder further includes a second bolt that extends through the coaxially aligned apertures of the base and the second platen thereby securing the second platen against the second side of the gunwale when the block is not attached to the second end of the base.

19. A kit as claimed in claim 15 and wherein the tube member includes a bracket which has an aperture formed therein and that extends substantially transversely relative to the bore of the tube member and wherein a support member extends between the clamp and the tube member, the support member having a foot that is releaseably mounted on the clamp and wherein an arm is mounted on the foot and extends upwardly therefrom, the arm having a socket that is adapted to substantially align with the aperture formed in the bracket, and wherein a pivot pin is inserted through the socket of the arm and the aperture of the bracket such that the tube member may be rendered pivotable about the pivot pin and selectively adjustable in the vertical plane.

20. A kit as claimed in claim 15 and further comprising:
   (a) a support member which extends between the clamp and the tube member, the support member having a foot with an aperture that extends therethrough and that is operable to be releasably mounted on the clamp and wherein an arm is mounted on the foot and extends upwardly therefrom and which is mounted on the tube member;
   (b) a spacer positioned between the foot of the support member and the clamp, the spacer having an aperture that is operable to be substantially aligned with the aperture that is formed in the foot of the support member; and (c) a pivot pin that is inserted through the aperture formed in the foot and the aperture formed in the spacer such that the support member may be rendered pivotable about the pivot pin to adjust the tube member in the horizontal plane.

21. A kit as claimed in claim 15 and wherein the base, first platen, first hinge, second platen, and second hinge of the clamp are formed as an integral piece.

22. A kit as claimed in claim 21 and wherein the clamp is made of polypropylene.

23. A kit as claimed in claim 15 and wherein the tube member has an outside boundary that is marked with a plurality of indicia that represent fishing variables that are to be monitored, the fishing rod holder further including a marker that is mounted on the tube member and that may be indexed to a particular indicium by a user in order to recall the variable represented by a particular indicium at a later time.

24. A clamp for mounting an article of interest in a predetermined attitude relative to a surface and which has a first side and a second side that oppose each other, the clamp comprising:

(a) a base having a longitudinal line of reference and an outer margin that defines first and second edges that are disposed substantially transversely of the longitudinal line of reference, a top surface the boundary of which is defined by the outer margin, and a bottom surface that opposes the top surface and that is operable to rest upon the surface to which the clamp is mounted;

(b) a first platen having an interior surface and an exterior surface, the first platen mounted on the first edge of the base by a first hinge and the first platen folding at the first hinge such that the interior surface of the first platen rests in juxtaposed mating relation against the first side of the surface to which the clamp is mounted; and (c) a second platen having an interior surface and an exterior surface, the second platen mounted on the second edge of the base by a second hinge, and the second platen folding at the second hinge such that the interior surface of the platen rests in juxtaposed mating relation against the second side of the surface to which the clamp is mounted.

25. A clamp as claimed in claim 24 and wherein the base has first and second apertures that individually communicate between the top and bottom surfaces thereof and that are disposed substantially along the longitudinal line of reference, and wherein the first and second platens each have individual apertures that individually communicate between the interior and exterior surfaces thereof and wherein the apertures formed in the first and second platens are disposed substantially along the longitudinal line of reference when the first aperture of the base is disposed in substantially coaxial alignment with the aperture formed in the first platen, the first platen is folded at the first hinge and rests in juxtaposed relation against the first side of the surface to which the clamp is mounted, and wherein when the second aperture of the base is disposed in substantial alignment with the aperture of the second platen, the second platen is folded at the second hinge and rests in juxtaposed relation against the second side of the surface to which the clamp is mounted, and wherein a first bolt extends through the first aperture formed in the base and the aperture formed in the first platen when the apertures are disposed in substantially coaxial alignment thereby securing the first platen against the first side of the surface to which the clamp is mounted and wherein a second bolt extends through the second aperture formed in the base and the aperture formed in the second platen when the apertures are disposed in substantially coaxial alignment thereby securing the second platen against the second side of the surface to which the clamp is mounted.

26. A clamp for mounting an article of interest in a predetermined attitude relative to a surface and that has a first side and a second side that oppose each other, the clamp comprising:

(a) a base having a longitudinal line of reference and an outer margin that defines first and second edges that are disposed substantially transversely of the longitudinal line of reference, a top surface the boundary of which is defined by the outer margin, and a bottom surface that opposes the top surface and which rests upon the surface to which the clamp is mounted;

(b) a platen having interior and exterior surfaces, the platen being mounted on the first edge of the base by a hinge and the platen operable to be folded at the hinge such that the interior surface of the platen abuts against the first side of the surface to which the clamp is mounted; and (c) a block that is operable to matingly engage the base and which depends from the bottom surface thereof at the second edge, the block having a side that forms a rigid surface that conforms to and abuts against the second side of the surface to which the clamp is mounted.

27. A clamp as claimed in claim 26 and wherein the base has an aperture that communicates between the top and bottom surfaces thereof and wherein the platen has an aperture that communicates between the interior and exterior surfaces thereof and wherein the aperture of the base and the platen are disposed along the longitudinal line of reference and wherein when the aperture of the base is disposed in substantially coaxial alignment with the aperture formed in the platen, the platen is folded at the hinge and abuts against the first platen of the surface to which the clamp is mounted, and wherein the fishing rod holder further includes a bolt that extends through the coaxially aligned apertures of the base and the aperture of the platen when the holes are in alignment thereby securing the platen against the first side of the surface to which the clamp is mounted.

28. A kit that may be assembled to form a clamp for mounting an article of interest in a predetermined attitude to a surface having a first side and a second side which oppose each other, the kit comprising:

(a) a base having a longitudinal line of reference and an outer margin that defines first and second edges that are disposed substantially transversely relative to the longitudinal line of reference, a top surface the boundary of which is defined by the outer margin, and a bottom surface that opposes the top surface and that rests upon the surface to which the clamp is mounted;

(b) a first platen having interior and exterior surfaces, the first platen being mounted on the first edge of the base by a first hinge and the first platen operable to fold at the first hinge such that the interior surface of the first platen abuts against the first side of the surface to which the clamp is mounted;

(c) a second platen having interior and exterior surfaces, the second platen being mounted on the second edge of the base by a second hinge and the second platen operable to fold at the second hinge such that the interior surface of the platen abuts against the second side of the surface to which the clamp is mounted; and (d) a block that is matingly engageable and depends from the bottom surface of the base at the second end thereof, and which has a side wall that forms a rigid surface that conforms to the shape of the second side of certain surfaces to which the clamp may be mounted, the block adapted to be substituted for the second platen in disposed and abutting relation against the second side of the surface to which the clamp is mounted when it is matingly mounted on and depending from the bottom surface of the base.

29. A kit as claimed in claim 28 and wherein the block includes a tooth and the bottom surface includes a channel that is adapted to matingly receive the tooth.

30. A kit as claimed in claim 28 and wherein the base has an aperture that communicates between the top and bottom surfaces thereof and wherein the first platen includes an aperture that communicates between the interior and exterior surfaces thereof and wherein the respective apertures are disposed along the longitudinal line of reference and wherein when the aperture of the base is disposed in substantially coaxial alignment with the aperture of the first platen, the first platen is folded at the first hinge and abuts against the first side of the surface to which the clamp is mounted, and wherein the fishing rod holder further includes a bolt that extends through the aperture of the base and the aperture of the first platen when the individual apertures are disposed in substantially coaxial alignment thereby securing the first platen against the first side of the surface to which the clamp is mounted.

31. A kit as claimed in claim 30 and wherein the base has a second aperture which communicates between the top and bottom surfaces thereof and wherein the second platen has an aperture that communicates between the interior and exterior surfaces thereof and wherein the second aperture and the aperture formed in the second platen are disposed along the longitudinal line of reference and wherein when the second aperture of the base is disposed in substantially coaxial alignment with the aperture of the second platen, the platen is folded at the second hinge and abuts against the second side of the surface to which the clamp is mounted, and wherein when the fishing rod holder further includes a second bolt that extends through the second aperture of the base and the aperture of the second platen when the apertures are disposed in substantially coaxial alignment thereby securing the second platen against the second side of the surface to which the clamp is mounted when the block is not attached to the second end of the base.

32. A fishing rod holder comprising:
(a) a tube member having an outside boundary defining a hollow bore which extends throughout the length of the tube member and which is operable to receive a fishing rod therewithin, and wherein the tube member further defines a longitudinal slot which communicates between the outside boundary and the bore thereof; and (b) a marker having a first leg and a second leg which are joined at an appex, the marker slideably engaging within the longitudinal slot in such a fashion wherein the first leg is disposed in contact with the outside boundary and the second leg is disposed in contact with the tube member which defines the bore, the first leg pointing to different indicia on the outside boundary as the marker slideably engages to different positions within the longitudinal slot.

* * * * *